US011975361B2

(12) United States Patent
Raichart

(10) Patent No.: US 11,975,361 B2
(45) Date of Patent: May 7, 2024

(54) TRANSVERSE BELT BUD SORTER AND RELATED METHODOLOGIES

(71) Applicant: Cullen Raichart, Las Vegas, NV (US)

(72) Inventor: Cullen Raichart, Las Vegas, NV (US)

( * ) Notice: Subject to any disclaimer, the term of this patent is extended or adjusted under 35 U.S.C. 154(b) by 0 days.

(21) Appl. No.: 17/860,651

(22) Filed: Jul. 8, 2022

(65) Prior Publication Data

US 2024/0009708 A1 Jan. 11, 2024

(51) Int. Cl.
*B07B 13/04* (2006.01)

(52) U.S. Cl.
CPC .................................... *B07B 13/04* (2013.01)

(58) Field of Classification Search
CPC ....... B07B 13/04; B07B 13/05; B07B 13/065; B65G 47/22; B65G 47/42; B65G 47/57; B65G 47/64; B65G 47/844; B65G 35/06
USPC .......................................................... 209/655
See application file for complete search history.

(56) References Cited

U.S. PATENT DOCUMENTS 1,931,454 A * 10/1933 Anderson ............. B65G 47/22 198/448
3,071,239 A * 1/1963 Burtness ................ B65G 47/82 198/370.07
3,190,329 A 6/1965 Bradway
3,236,379 A * 2/1966 Branchla ................ B07B 13/04 209/247
3,921,789 A 11/1975 Goldinger et al.
4,382,471 A 5/1983 Peterson
5,238,099 A 8/1993 Schroeder et al.
7,723,670 B1 5/2010 Yan
2006/0070854 A1 4/2006 Boelaars
2006/0249354 A1* 11/2006 Riddick ............... B65G 47/244 198/779
2015/0203303 A1* 7/2015 Eisenberg ................. B07C 3/06 198/370.01
2020/0130939 A1* 4/2020 Davies ................... B65G 21/12

FOREIGN PATENT DOCUMENTS

NL 8303058 A * 4/1985 ........... B07B 13/065
WO 2022072086 4/2022

* cited by examiner

*Primary Examiner* — Michael McCullough
*Assistant Examiner* — Jessica L Burkman
(74) *Attorney, Agent, or Firm* — Buche & Associates, PC; Bryce A. Johnson; John K. Buche

(57) ABSTRACT

Disclosed is a sorting device for separating buds or other product into groups by size. The device may be generally defined by two, spaced apart conveyor belts that operate in transverse directions such that items placed in the space between the two conveyor belts move in transverse directions depending on their size.

5 Claims, 5 Drawing Sheets

TRANSVERSE BELT BUD SORTER AND RELATED METHODOLOGIES

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of item sorters and, in particular, bud sorters.

Background of the Invention

Marijuana is a psychoactive drug from the Cannabis plant used for medical or recreational purposes. The primary psychoactive component of cannabis is tetrahydrocannabinol (THC), which is one of the four-hundred and eighty-three (483) known compounds in the plant, including at least sixty-five (65) other cannabinoids. Cannabis may be smoked, vaporized, eaten once processed and embedded in food, or rubbed on topically as an extract.

The oldest evidence of people using cannabis for psychoactive purposes was found in Romanian kurgans dated 3,500 BC, and scholars suggest that the drug was first used in tribal ritual ceremonies. Beginning in the 19th century cannabis spread to Europe, and was subsequently criminalized in various European countries by the late $20^{th}$ century.

Today, as the benefits of cannabis become more evident, attitudes toward medical and recreational cannabis are changing. The shift in attitude has led to the changing legality of cannabis in countries and states around the world. In many places the severity of punishment for use, possession, or manufacture of cannabis has become less harsh, and in other places, vanished entirely. As of today, Cannabis is legal in Canada, California, Colorado, Washington, South Africa, and Uruguay among others. Further, Cannabis has been recently decriminalized in the Czech Republic, Colombia, Ecuador, and Mexico among many others.

In 2013, it was estimated that between 128 and 232 million people used cannabis (2.7% to 4.9% of the global population between the ages of and 65). Cannabis is considered by far to be the most widely used illicit substance. Historically this need was satisfied by the black market cannabis industry which is comprised of small underground organizations and growers. However, the changing legal status of cannabis has led to underground organizations being replaced by companies, unlicensed sellers being replaced by dispensaries, and laborers being replaced by machines. In other words, a group of small underground enterprises has been replaced by a modern industry remarkably fast. Due to the rapid modernization of the industry, often referred to as the green rush, there exists many opportunities for improvements to the outdated tools and methods of the black market cannabis industry. This patent application specifically speaks to opportunities for cannabis workers to be made more efficient through the use of machines.

When processing material, namely cannabis it is often necessary to sort the cannabis buds by size to maximize the efficiency of the harvest process. Generally, processing the same size flower material in an automatic trim machine equates to more timely and more effective trimming. Once the cannabis flowers are sorted, they can be further processed in a trim machine or other processing device depending on size. Sorting can also be done after the trimming process is complete. Sorting the trimmed flowers by size can also make the material or cannabis flower more marketable.

Historically, sorting was done by hand. Sorting by hand is often a tedious and slow process. However, automating the sorting of the cannabis flowers can have a dramatic impact over the entire harvest process, especially for large scale operations that already utilize other automated devices.

There have been many attempts to build a machine that sorts buds by size, however these machines have many imperfections. Often these machines are cost prohibitive, inefficient, hard to maintain, limited to different sized buds, stationary, unwieldy, or fail to work with both wet and dry product. Thus, a need exists for an inexpensive, easy to maintain, efficient band drive bud sorter which can sort buds of all sizes.

Listing of Related Art

The following list of prior art contains disclosures that are incorporated by reference:

U.S. Pat. No. 5,238,099 by Schroeder et al. (issued Aug. 24, 1993) discloses a "conveying system."

U.S. Pat. No. 3,921,789 by Goldinger et al (issued Nov. 25, 1975) discloses a "method and apparatus for transferring articles from a conveyor."

U.S. Pat. No. 4,382,471 by Peterson (issued May 10, 1983) discloses "low damage beet cleaner and elevator."

U.S. Pat. No. 3,190,329 by Bradway (issued Jun. 22, 1965) discloses an "article scouring conveyor."

U.S. Pat. No. 7,723,670 by Ryan (issued Jul. 3, 2007) discloses a "transverse-roller belt conveyor."

U.S. Pat. Pub. No. US 2006/0070854 by Boelaars (pub. Apr. 6, 2006) discloses a sorting system using a roller-top conveyor belt.

Int'l Pat. Pub. No. WO 2022/072086 by Navarrette et al. (pub. Apr. 7, 2022) discloses a "roller-belt sorter with booster."

SUMMARY OF THE INVENTION

In view of the foregoing, an object of this specification is to disclose a sorting device for separating buds into groups by size. A preferred embodiment of such a sorting device is called a transverse belt bud sorter. Suitably, the disclosed belt sorter works by running two conveyor belts where one of the conveyor belts is cleated and situated over/above and transverse to an uncleated or flat conveyer belt. Suitably, the bottom conveyor belt is the flat conveyor belt, and the upper conveyor belt is a finned (cleated) conveyor belt wherein each cleat or fin is separated from another fin/cleat according to a pattern of predetermined spaces.

When a bunch of buds is provided to between the two conveyor belts, buds that are too small to interact with both conveyor belts at the same time are conveyed by the flat conveyor belt in a first direction while buds that are big enough to interact with both conveyor belts at once (i.e., at the same time) are moved by the cleats in a second direction that is transverse relative to the first direction.

In a preferred embodiment, there is an adjustable, tapered space between the two transverse conveyor belts. More specifically, the plane of the cleated conveyor belt may be pitched relative to the horizon while the flat belt is not pitched relative to the horizon so that the cleated conveyor belt is obliquely inclined relative to the flat belt. Suitably, the above-described inclined relationship creates a tapering gap between the two conveyor belts whereby a bunch of buds may be separated from one another via moving the buds along the flat conveyor belt in a first direction until the tapered gap closes on the buds from large to small. In one preferred mode of operation, as the tapered gap closes on the buds, contact of each bud with both conveyor belts restricts the bud from further moving in the first direction so that the cleats are able to sweep the buds in the second, transverse direction. In other words, the inclined gap between the two conveyor belts creates a distribution of large to small buds along the flat conveyor belt so that the buds may be swept in the transverse direction by the cleats of the cleated conveyor belt for collection after the buds are swept off the side of the flat belt. Optionally, both belts may be collectively and equally rolled one way or the other relative to the horizon so that smaller buds have a tendance to fall toward the roll direction as the bunch of buds are conveyed along the flat belt to between the two belts. Buds that are too small are conveyed for collection at the end of the flat conveyor belt.

In use, the device may sort buds according to size. In one preferred mode of operation, product that needs to be sorted is placed on the flat belt and while the products move through the machine, the cleated conveyor belt is operated to kick or move buds off of the flat conveyor belt. In other words, the flat belt carries the product through the machine to interact with the inclined and cleated belt, which runs in either direction transverse to the cleated belt so that the fins or cleats interact with product moving underneath between the two belts. In this operation, buds are preferably swept off the flat conveyor belt according to size, wherein the size of the bud changes according to the incline of the cleated belt relative to the flat belt because the space between the two belts changes from larger to smaller along the incline.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFFERED EMBODIMENTS

Disclosed is a preferred embodiment of a sorting device for separating buds or other product into groups by size. The device is generally defined by two, spaced apart conveyor belts that operate in transverse directions such that items placed in between the two conveyor belts are distributed by size along one of the conveyor belts while being moved in transverse directions by the other conveyor belt. The more specific details of the device are described in connection with the figures.

FIGS. 1 through 4 are respectively a prospective view, a top view, a front view, and a side view of the transverse belt bud separator or belt sorter 1000. As shown, the disclosed belt sorter 1000 is essentially defined by two conveyor belts where one of the conveyor belts is a cleated conveyor belt 1100 that is situated over/above and transverse to an uncleated or flat conveyer belt 1200. Suitably, the bottom conveyor belt is the flat conveyor belt 1200, and the upper conveyor belt is a finned (cleated) conveyor belt 1100 wherein each cleat 1110 or fin is separated from another fin/cleat according to a pattern of predetermined spaces. See, e.g., FIG. 2.

Figure 1:
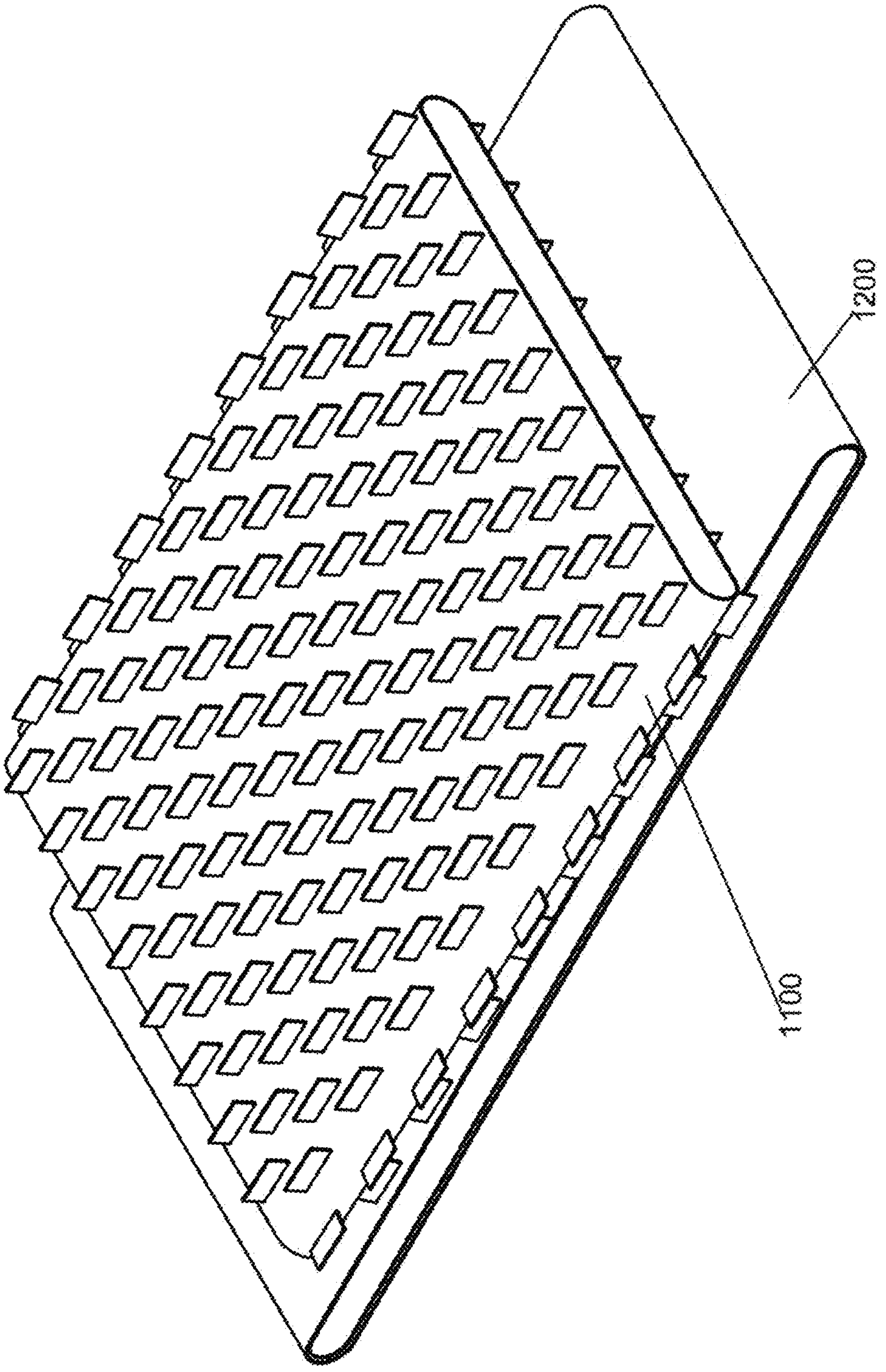
FIG. 1 is a prospective view of a preferred embodiment of a transverse belt bud separator.
Figure 2:
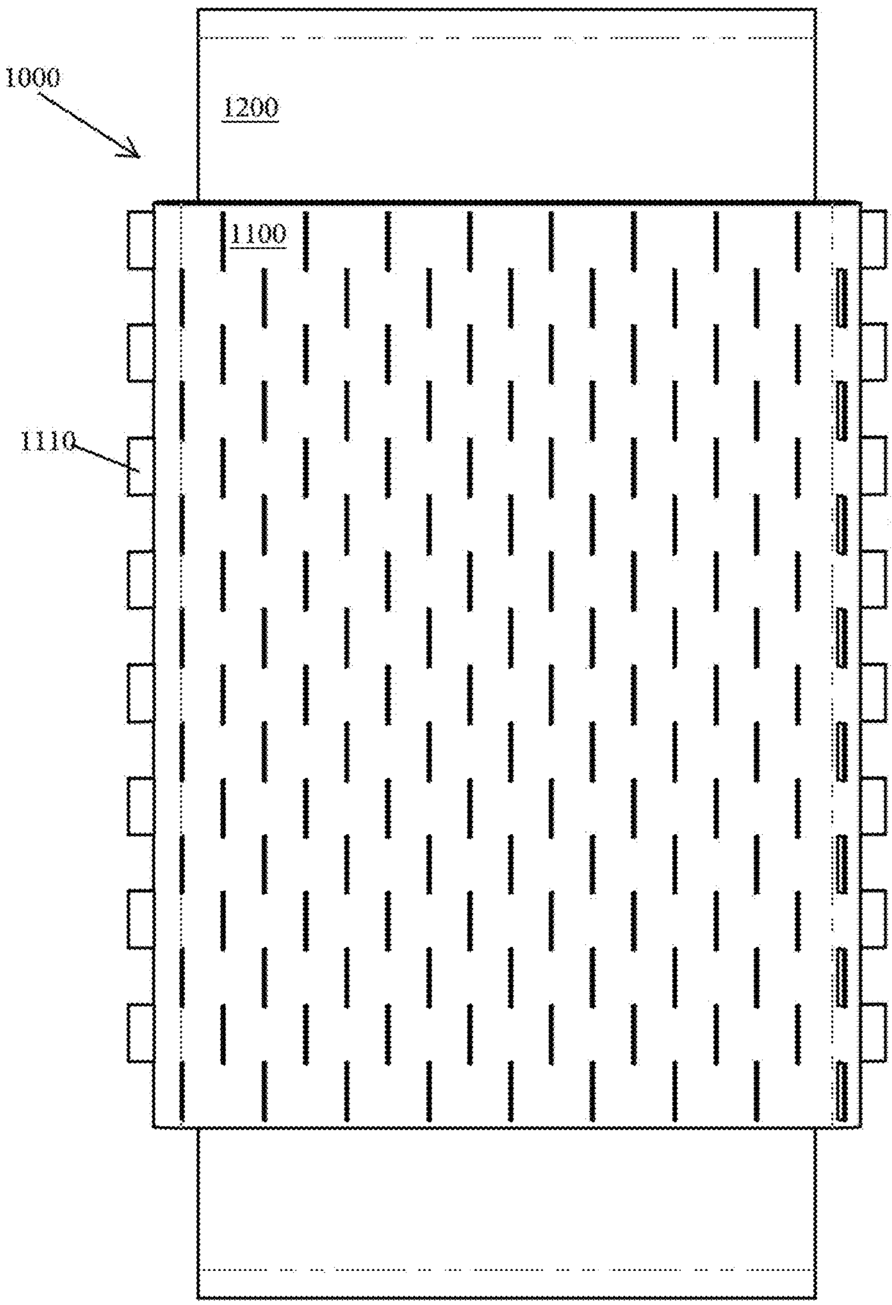
FIG. 2 is a top view of the transverse belt bud separator.
Figure 4:
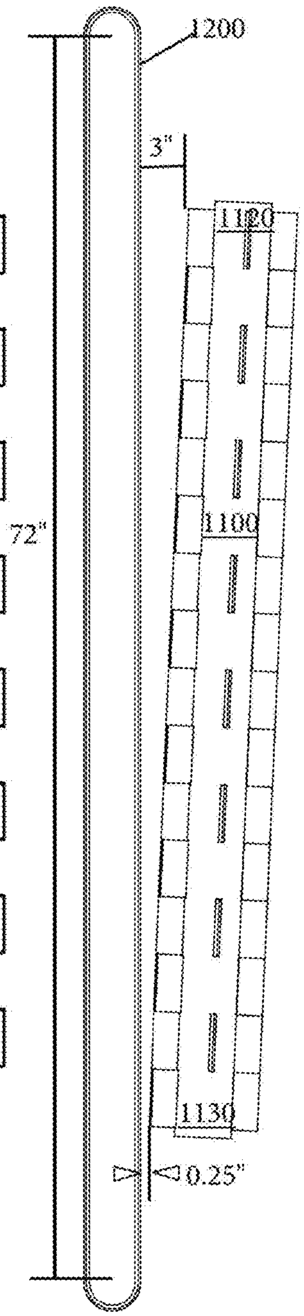
FIG. 4 is a side view of the transverse belt bud separator.
Figure 3:
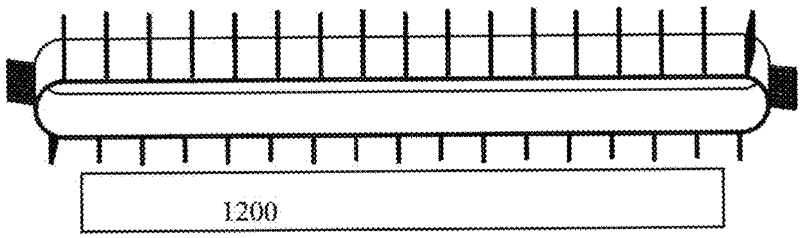
FIG. 3 is a front view of the transverse belt bud separator.

In a preferred embodiment, there is an adjustable, tapered space between the two transverse conveyor belts 1100, 1200. As shown in FIG. 4, the plane of the cleated conveyor belt may be pitched relative to the horizon while the flat belt is not pitched relative to the horizon so that the cleated conveyor belt is obliquely inclined relative to the flat belt. Suitably, the above inclined relationship creates a tapering gap between the two conveyor belts. See FIG. 4. As shown, the tapering gap (defined between a surface of the flat belt 1200 and cleats 1110 of the cleated belt 1100) may suitably be three inches (plus zero or minus two) on a first side 1120 of the cleated belt 1100 and a half inch (plus one or minus a quarter) on the other end 1130 (aka "second side 1130") of the cleated belt 1100. The length of the flat belt may suitably be seventy-two inches (plus or minus a tenth of an inch) as measured, e.g., between the axis of two rollers or spindles of the conveyor belt. See also FIG. 6. Suitably, the pitch of the cleated conveyor belt 1100 may be adjusted by raising or lowering the first and second sides 1120, 1130 of cleated belt 1100 so that the tapered gap may be customized by a user to a gap size that falls within tolerances mentioned in this specification.

Figure 5:
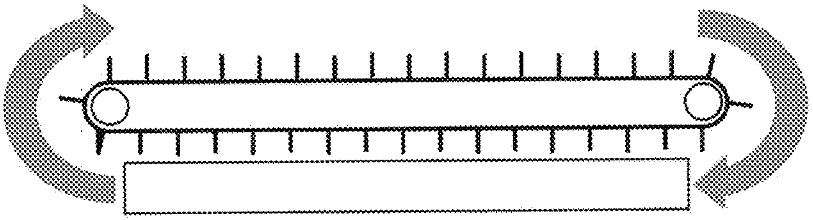
FIG. 5 is an environmental front view of the transverse belt bud separator with arrows to illustrate the direction a cleated belt moves during a typical operation of the separator.
Figure 7:
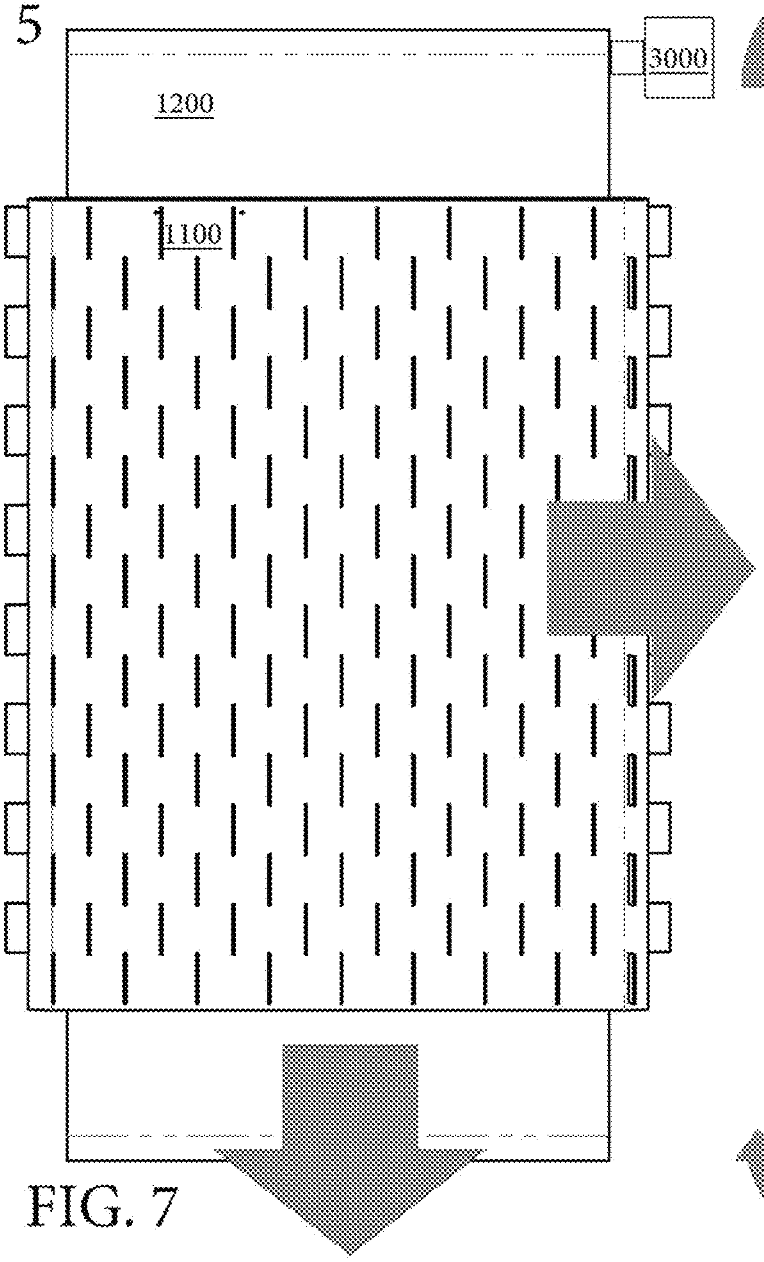
FIG. 7 is an environmental top view of the transverse belt bud separator with arrows to illustrate the transverse directions the cleated and flat belts move relative to one another during a typical operation of the separator.
Figure 6:
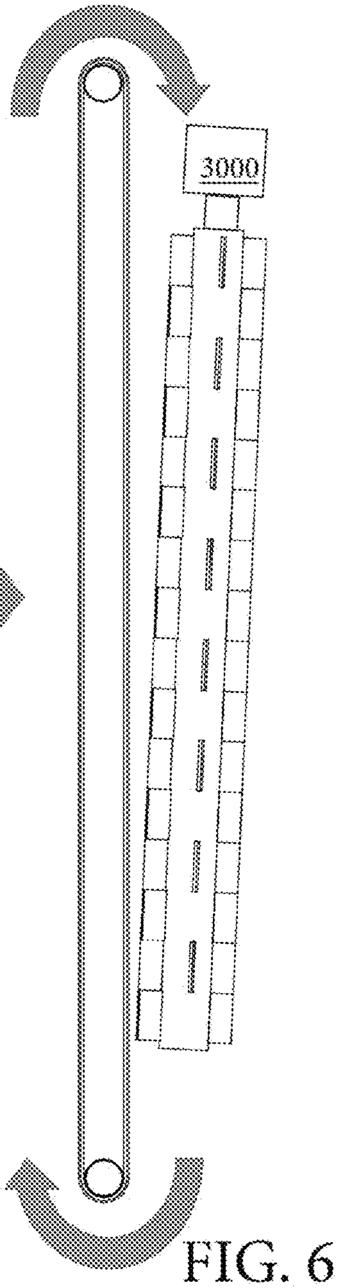
FIG. 6 is an environmental side view of the transverse belt bud separator with arrows to illustrate the direction a flat belt moves during a typical operation of the separator.

FIG. 5 is an environmental front view of the transverse belt bud separator 1000 with arrows to illustrate the direction a cleated belt 1100 moves during a typical operation of the separator 1000. FIG. 6 is an environmental side view of the transverse belt bud separator with arrows to illustrate the direction a flat belt 1200 moves during a typical operation of the separator 1000. FIG. 7 is an environmental top view of the transverse belt bud separator 1000 with arrows to illustrate the transverse directions the cleated and flat belts 1100,1200 move relative to one another during a typical operation of the separator 1000. As set forth above, a preferred embodiment, there is an adjustable, tapered space between the two transverse conveyor belts. As set forth below, a bunch of buds may be separated from one another via moving the buds along the flat conveyor belt in a first direction until the tapered gap closes on the buds from large to small. As discussed in greater detail below, when a bunch of buds is provided to between the two conveyor belts, buds that are too small to interact with both conveyor belts at the same time are conveyed by the flat conveyor belt in a first direction while buds that are big enough to interact with both conveyor belts at once (i.e., at the same time) are moved by the cleats in a second direction that is transverse relative to the first direction. See, e.g., FIGS. 9A through 9C. Buds that are too small are conveyed for collection at the end of the flat conveyor belt. Id.

It should be noted that, as depicted, each of the conveyor belts are configured with a chassis (not shown) and rollers or spindles that are driven by a reversable motor or reversable motors (3000). Those of skill in the art will know well the types and configurations of chassis (not shown), rollers/spindles or motors that are necessary for accomplishing the setup and processes described herein.

Figure 8A:
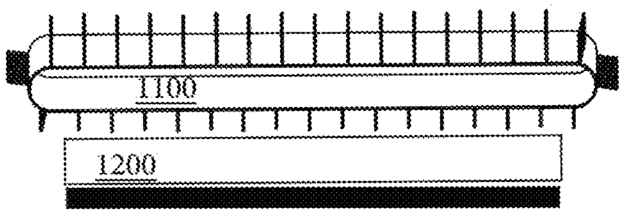
FIG. 8A is an environmental front view of the transverse belt bud separator with zero degree yaw relative to the horizon.
Figure 8B:
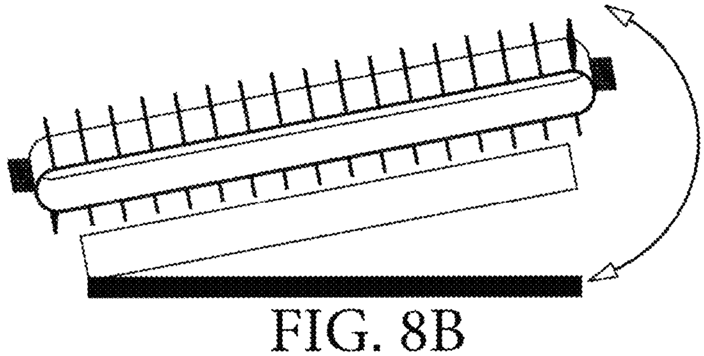
FIG. 8B is an environmental front view of the transverse belt bud separator where both the cleated and flat belts are situated with an approximately ten degree yaw relative to the horizon.
Figure 8C:
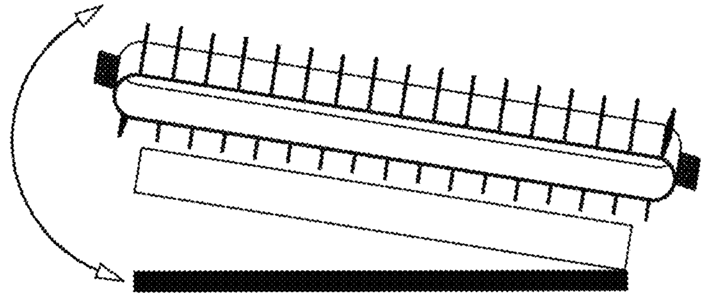
FIG. 8C is an environmental front view of the transverse belt bud separator where both the cleated and flat belts are situated with an approximately negative ten degree yaw relative to the horizon.

Optionally, both belts may be equally rolled one way or the other relative to the horizon so that smaller buds have a tendance to fall toward the roll direction as the bunch of buds is conveyed along the flat belt to between the two belts. FIG. 8A is an environmental front view of the transverse belt bud separator with zero degree yaw relative to the horizon. FIG. 8B is an environmental front view of the transverse belt bud separator where both the cleated and flat belts are situated with an approximately ten degree yaw relative to the horizon. FIG. 8C is an environmental front view of the transverse belt bud separator where both the cleated and flat belts are situated with an approximately negative ten degree yaw relative to the horizon.

More specifically, the plane of the cleated conveyor belt may be pitched relative to the horizon while the flat belt is not pitched relative to the horizon so that the cleated conveyor belt is obliquely inclined relative to the flat belt. Suitably, the above inclined relationship creates a tapering gap between the two conveyor belts whereby a bunch of buds may be separated from one another via moving the buds along the flat conveyor belt in a first direction until the tapered gap closes on the buds from large to small. As the tapered gap closes on the buds, contact of each bud with both conveyor belts prevents the bud from further moving in the first direction so that the cleats are able to sweep the buds in the second, transverse direction. In other words, the inclined gap between the two conveyor belts creates a distribution of large to small buds along the flat conveyor belt so that the buds may be swept in the transverse direction by the cleats of the cleated conveyor belt for collection.

In use, the device may sort buds according to size. In one preferred mode of operation, product that needs to be sorted is placed on the flat belt and while the products move through the machine, the cleated conveyor belt is operated to kick or move buds off of the flat conveyor belt. In other words, the flat belt carries the product through the machine to interact with the inclined and cleated belt, which runs in either direction transverse to the cleated belt so that the fins or cleats interact with product moving underneath between the two belts. In this operation, buds are preferably swept off the flat conveyor belt according to size, wherein the size of the bud changes according to the incline of the cleated belt relative to the flat belt because the space between the two belts changes from larger to smaller along the incline.

Figure 9A:
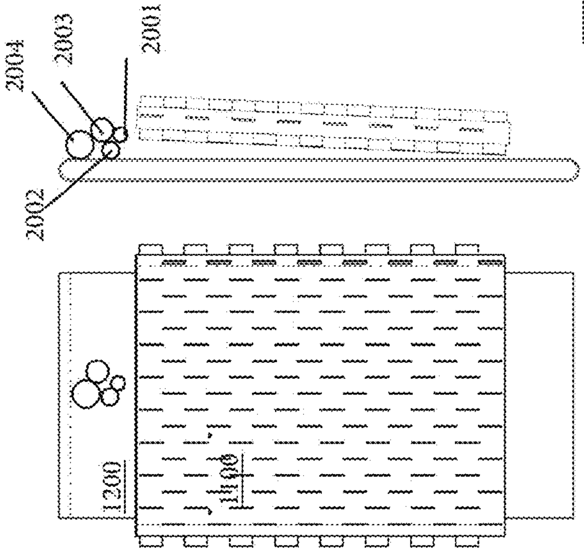
FIG. 9A is an environmental top and side view of the transverse belt bud separator with a bunch of variously sized buds to be separated from one another loaded onto the rear portion of the flat belt.
Figure 9B:
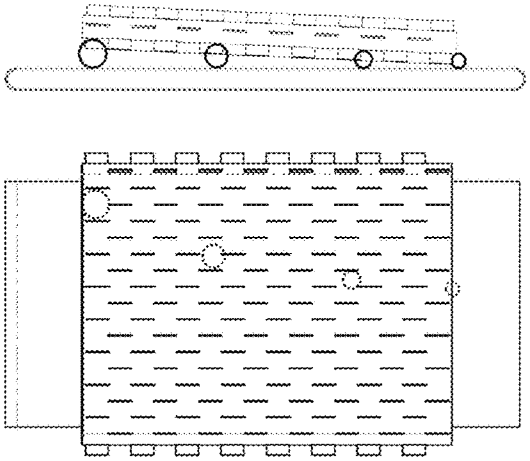
FIG. 9B is an is an environmental top and side view of the transverse belt bud separator where the bunch of variously sized buds are disposed between the cleated and flat belts; and, FIG. 9C is an environmental top and side view of the transverse belt bud separator where the bunch of variously sized buds are separated by size.
Figure 9C:
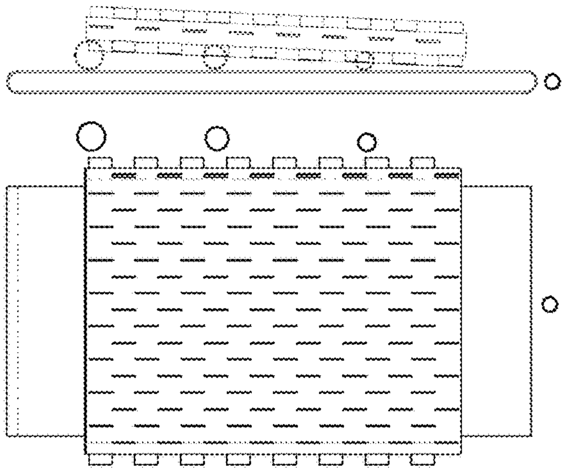

FIG. 9A is an environmental top and side view of the transverse belt bud separator 1000 with a bunch of variously sized buds 2001, 2002, 2003, and 2004 to be separated from one another loaded onto the rear portion of the flat belt 1200. FIG. 9B is an is an environmental top and side view of the transverse belt bud separator 1000 where the bunch of variously sized buds 2001, 2002, 2003, and 2004 are disposed between the cleated and flat belts 1100, 1200. FIG. 9C is an environmental top and side view of the transverse belt bud separator 1000 where the bunch of variously sized buds 2001, 2002, 2003, and 2004 are separated by size. As illustrated, in one preferred mode of operation, product (e.g., variously sized buds 2001, 2002, 2003, and 2004) that needs to be sorted is placed on the flat belt 1100 (FIG. 9A) and while the product (2001, 2002, 2003, 2004) moves through the machine (FIG. 9B), the cleated conveyor belt 1100 is operated to kick or move buds (2001, 2002, 2003, 2004) off of the flat conveyor belt 1200 (FIG. 9C). In other words, the flat belt 1200 carries the product (2001, 2002, 2003, 2004) through the machine to interact with the inclined and cleated belt, which runs in either direction transverse to the cleated belt so that the fins or cleats interact with product moving underneath between the two belts. In other words, buds are swept off the flat conveyor belt according to size, wherein the size of the bud changes according to the incline of the cleated belt relative to the flat belt because the space between the two belts changes from larger to smaller along the incline. Suitably, the cleats 1110 are designed to allow product to pass through the fins/cleats 1110 until the bottom edge of one of the fins 1110 contact an item or bud. Once the fins 1110 contact the item or bud (2001, 2002, 2003, 2004), the item or bud (2001, 2002, 2003, 2004) is swept out the side, and off of the flat conveyor belt 1200. Suitably, the machine 1000 can be fed continuously and run without stopping (FIGS. 9A-9C), allowing the user to sort product (2001, 2002, 2003, 2004) as long as necessary.

Referring to FIG. 9C, the separated product is dispensed out the side or front of the separator 1000. The dispensing side could be one side or the other depending on the direction of the cleated belt's rotation and the roll angle of the device 1000. Referring back to FIG. 8A through 8C, both conveyors are mounted on a swivel (FIGS. 8A-8C) that allows them to be tilted up to ten degrees relative to the horizon (black line) in either direction. The exit of the product (2001, 2002, 2003, 2004) should preferably always be on the higher end of the machine because the roll angle helps the accuracy of the sorter 1000 by allowing smaller pieces of product (2001, 2002, 2003, 2004) to move out of the way when a larger piece of product (2001, 2002, 2003, 2004) is being moved along with it. If there is a piece of small product (2001) in front of a larger piece of product (2004), and the larger product (2004) is going to be ejected from the machine 1000, the smaller product (2001) will likely be swept out at the same time. However when the belts are rolled at an angle of up to ten degrees, the smaller flower (2001) will tend to roll out of the way of the larger product (2004) and down the slant created by the machine's 1000 rolled orientation.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A sorting device for separating buds or other product into groups by size, where said device comprises:

a flat conveyor belt that is driven by a reversable motor in a first direction such that a surface of the flat conveyor defines a first plane;

a cleated conveyor belt with a first row of cleats and a second row of cleats, where said first row of cleats is offset from said second row of cleats such that a first bud of a first size passing between two cleats of the first row is conveyed in the first direction, where said cleated conveyor belt with the first and second rows of cleats is driven by a reversable motor in a second direction that is transverse relative to the first direction such that a surface of the conveyor belt with the first and second rows of cleats defines a second plane;

wherein the second plane is pitched relative to the first plane such that a tapered gap is defined between said first and second planes;

wherein the tapered gap is further defined at a first location by a first distance of separation between the first and second planes such that the first row of cleats is located along the first location;

wherein said tapered gap is further defined at a second location by a second distance of separation between the first and second planes such that the second row of cleats is located along the second location; and, wherein the first bud of the first size and a second bud of a second size are placed together at an initial location on the flat conveyor belt so that the flat conveyor belt conveys the first and second buds to within the tapered gap;

wherein the first bud is positioned between said two cleats of the first row of cleats such that the first bud is contacted by a surface of the cleated conveyor belt and at least one of said two cleats of the first row of cleats after being conveyed by the flat belt to said first location and wherein the first size of the first bud is such that the first bud closes the first distance of separation at the first location so that the first bud is conveyed along the first location in the second direction via the cleated conveyor belt and said one of said two cleats of the second row of cleats; and, wherein the second bud is positioned adjacent to the cleat in the second row of cleats such that the second bud is contacted by the surface of the cleated conveyor belt and the cleat in the second row of cleats after being conveyed by the flat belt to said second location and wherein the second size of the second bud is such that the second bud closes the second distance of separation at the second location so that the second bud is conveyed along the second location in the second direction via the cleated conveyor belt and the cleat in the second row of cleats.

2. A sorting device defined by a flat conveyer belt configured to convey items in a first direction, a cleated conveyor belt configured to convey items in a second direction that is transverse to the first direction, and one of said items is conveyed by the flat conveyor belt until it is positioned to close i-R a tapered gap defined between said flat and cleated conveyor belts such that the one of said items is conveyed in the second direction via the cleated conveyor belt while the remainder of said items are further conveyed via the flat conveyor belt in the first direction.

3. The sorting device of claim 1 where the first plane is on the horizon.

4. The sorting device of claim 1 where the first plane is rolled relative to the horizon.

5. The sorting device of claim 1 wherein:

the cleated conveyor belt further features another row of cleats that is offset from said second row of cleats such that another bud of another size passing between two cleats of the second row is directed in the first direction;

said tapered gap is further defined at another location by another distance of separation between the first and second planes such that the another row of cleats is located along the another location; and, wherein the another bud is positioned adjacent to the cleat in the another row of cleats such that the another bud is contacted by the surface of the cleated conveyor belt and the cleat in the another row of cleats after being conveyed by the flat belt to said another location and wherein the another size of the another bud is such that the another bud closes the another distance of separation at the another location so that the another bud is conveyed along the another location in the second direction via the cleated conveyor belt and the cleat in the third row of cleats.

* * * * *